(12) United States Patent
Boone et al.

(10) Patent No.: US 9,050,757 B1
(45) Date of Patent: Jun. 9, 2015

(54) SYSTEM AND METHOD FOR CURING COMPOSITES

(71) Applicant: Cessna Aircraft Company, Wichita, KS (US)

(72) Inventors: Richard Boone, Wichita, KS (US); Benjamin De Putter, Maize, KS (US)

(73) Assignee: Textron Innovations, Inc., Providence, RI (US)

( * ) Notice: Subject to any disclaimer, the term of this patent is extended or adjusted under 35 U.S.C. 154(b) by 304 days.

(21) Appl. No.: 13/763,584

(22) Filed: Feb. 8, 2013

Related U.S. Application Data (60) Provisional application No. 61/596,639, filed on Feb. 8, 2012.

(51) Int. Cl.
| | | |
|---|---|---|
| *B29C 70/34* | (2006.01) | |
| *B32B 37/10* | (2006.01) | |
| *B29C 70/44* | (2006.01) | |

(52) U.S. Cl.
CPC ............... *B29C 70/34* (2013.01); *B32B 37/10* (2013.01); *B29C 70/44* (2013.01); *Y10T 156/10* (2013.01)

(58) Field of Classification Search
CPC   B64C 2001/0072; B64C 1/064; B29C 70/00; B29C 70/34; B29C 70/44; Y10T 156/10
USPC ........... 156/60, 242, 245, 285, 286, 500, 381, 156/382; 264/572, 571, 101, 102, 257, 258
See application file for complete search history.

(56) References Cited

U.S. PATENT DOCUMENTS

| | | |
|---|---|---|
| 4,770,929 A | 9/1988 | Nobumasu et al. |
| 4,833,029 A | 5/1989 | DuPont et al. |
| 5,123,985 A | 6/1992 | Evans et al. |
| 5,242,523 A | 9/1993 | Willden et al. |
| 5,368,807 A | 11/1994 | Lindsay |
| 5,562,796 A | 10/1996 | Ertl |
| 5,604,010 A | 2/1997 | Hartz et al. |
| 5,707,576 A | 1/1998 | Asher |
| 6,128,998 A | 10/2000 | Freitas et al. |
| 6,458,309 B1 | 10/2002 | Allen et al. |
| 6,589,472 B1 | 7/2003 | Benson et al. |

(Continued)

OTHER PUBLICATIONS

Office Action in related U.S. Appl. No. 12/829,234 dated Jan. 3, 2011, 10 pages.

(Continued)

*Primary Examiner* — Jeff Aftergut
(74) *Attorney, Agent, or Firm* — Lathrop & Gage LLP (57) ABSTRACT

An internally heated and pressurized system for fabricating a composite laminate structure and method for use thereof is disclosed. One of a plurality of thin, thermally conductive bond tools, prepreg fiber reinforced composite layers, and a pressure applying membrane are nested within a heated base, and then covered by a pressure sealed cover. The system is pressurized through the pressure sealed cover. The pressure causes the pressure applying membrane to force the prepreg fiber reinforced composite layers onto the upper surface of the bond tool. The heated base transfers heat to the composite layers via the bond tool, which heats and cures the composite layers together and to a shape determined by the upper surface of the bond tool. Each bond tool is formed with a generic lower surface for nesting within the heated base and an upper surface for forming composite layers into the shape of a specific part.

22 Claims, 6 Drawing Sheets

(56) References Cited

U.S. PATENT DOCUMENTS

| | | |
|---|---|---|
| 6,632,502 B1 | 10/2003 | Allen et al. |
| 8,307,872 B2 * | 11/2012 | Kendall et al. ............. 156/583.1 |
| 2002/0006523 A1 | 1/2002 | Obeshaw |
| 2002/0071920 A1 | 6/2002 | Obeshaw |
| 2003/0082385 A1 | 5/2003 | Li et al. |
| 2003/0168555 A1 | 9/2003 | Livi et al. |
| 2003/0198775 A1 | 10/2003 | Roth et al. |
| 2004/0115299 A1 | 6/2004 | Potter et al. |
| 2004/0175555 A1 | 9/2004 | Ogisu |
| 2005/0183808 A1 | 8/2005 | Barguet et al. |
| 2005/0183818 A1 | 8/2005 | Zenkner et al. |
| 2006/0006599 A1 | 1/2006 | Shahidi et al. |
| 2006/0049552 A1 | 3/2006 | Fish |
| 2006/0254710 A1 | 11/2006 | Jung et al. |
| 2008/0083494 A1 | 4/2008 | Sander et al. |
| 2008/0265093 A1 | 10/2008 | Munoz Lopez et al. |
| 2009/0020645 A1 | 1/2009 | Cacciaguerra |
| 2009/0074905 A1 | 3/2009 | Matsen et al. |
| 2009/0261199 A1 | 10/2009 | McCarville et al. |
| 2009/0263618 A1 | 10/2009 | McCarville et al. |
| 2009/0283638 A1 | 11/2009 | Arevalo Rodriguez et al. |
| 2009/0320398 A1 | 12/2009 | Gouvea |
| 2010/0098910 A1 | 4/2010 | Naritomi et al. |
| 2010/0159189 A1 | 6/2010 | Takagi et al. |
| 2011/0045232 A1 | 2/2011 | Kismarton |
| 2011/0097554 A1 | 4/2011 | Kehrl et al. |

OTHER PUBLICATIONS

Response to Office Action in related U.S. Appl. No. 12/829,234 dated Mar. 18, 2011, 10 pages.

Office Action in related U.S. Appl. No. 12/829,234 dated Mar. 31, 2011, 13 pages.

Office Action in related U.S. Appl. No. 12/779,706 dated Aug. 1, 2011, 18 pages.

Notice of Allowance issued in related U.S. Appl. No. 12/779,706 dated Jan. 26, 2012, 9 pages.

Notice of Allowance issued in related U.S. Appl. No. 12/829,234 dated Jan. 19, 2013, 15 pages.

* cited by examiner

SYSTEM AND METHOD FOR CURING COMPOSITES

CROSS-REFERENCE TO RELATED APPLICATIONS

This application claims priority to U.S. Provisional Application Ser. No. 61/596,639 (hereinafter "'639 provisional"), filed 8 Feb. 2012 and incorporated herein by reference.

BACKGROUND OF THE INVENTION

Composite laminates are often made from woven or unidirectional materials that have been impregnated by, for example, "B" staged resins. A laminate is constructed by layering impregnated materials onto a defined tool surface. Pressure is applied to consolidate the impregnated material and then heated to cure, for example, in a pressurized oven, called an autoclave or an oven under vacuum. These are large and expensive machines that make construction of composite laminates incompatible with the small manufacturer.

SUMMARY

The present system and method forms composite structures quickly, using little energy and occupying a small space. The present system and method also allows for use of multiple bond tools with a single heating base.

Fiber reinforced composite structures are made using an internally heated and pressurized system. The heated and pressurized system includes a heated base, a bond tool, a pressure seal and a pressure sealed cover. The heated base is heated to a temperature for curing fiber reinforced composite. Among other things, the heated base may operate to bring the temperature of the composite up evenly and helps with driving gasses, given off during the cure, to escape from the bond tool. The bond tool is placed within the heated base, and one or more pre-impregnated (prepreg) fiber reinforced composite layer(s) are laid into an interior portion of the bond tool. The pressure seal is positioned over said bond tool and cooperates with the pressure sealed cover to provide a seal over an interior portion of the bond tool. The pressure sealed cover is coupled to a portal or port, wherein the portal of the pressure sealed cover includes a coupling for a pressure applying device. Pressure is applied through the portal onto the pressure seal, which forces the prepreg fiber reinforced composite layer(s) to conform to the interior portion of the bond tool until said prepreg fiber reinforced composite layer(s) fully cure via the heated base.

In an embodiment, the preparation of an internally heated and pressurized system for fabricating a fiber reinforced composite structure from one or more pre-impregnated (prepreg) fiber reinforced composite layers is described here. Preparing the internally heated and pressurized system includes heating a base using one or more heating elements integrated with the base. Layers of one or more prepreg fiber reinforced composite layers are oriented within an upper, shaped surface of a bond tool. The lower surface of the bond tool is mated with an interior space of the heated base, which is shaped to accommodate the lower surface of the bond tool. A pressure applying membrane is placed over the bond tool and the prepreg fiber reinforced composite layers, and a pressure seal is incorporated to facilitate sealing the prepreg fiber reinforced composite layers within a pressure sealed region. A pressure sealed cover is placed over the heated base, the bond tool, and the pressure applying membrane and in contact with the pressure seal, which is then secured to the heated base. A pressure providing apparatus is connected to a pressure port on the pressure sealed cover for generating a pressure sealed region between the pressure sealed cover and the pressure applying membrane. Heat from the heated base and pressure in the pressurized region facilitate curing of the prepreg fiber reinforced composite layers to each other and into a bond tool determined shape.

In an embodiment, the internally heated and pressurized system for fabricating a fiber reinforced composite structure includes a heated base, a bond tool, and a pressure sealed cover. The heated base includes one or more heating elements and is formed with an interior space. The interior space is formed for accepting the bond tool. The bond tool having a lower surface and an upper surface, the lower surface configured to mate with the interior space of the heated base such that the heated base supports the bond tool. The upper surface of the bond tool is configured to accept one or more pre-impregnated fiber reinforced composite layers for forming the fiber reinforced composite structure. The pressure sealed cover for securing with the heated base to cover the heated base, the bond tool, and the one or more fiber reinforced composite layers. The pressure sealed cover forming a pressure port for coupling with a pressure providing apparatus.

A method for forming a fiber reinforced composite structure from one or more pre-impregnated (prepreg) fiber reinforced composite layers using an embodiment of the internally heated and pressurized system is disclosed. The present embodiment of the internally heated and pressurized system includes a heated base having heating elements and an interior space formed of one or more interior walls, a bond tool having an upper shaped surface and a lower surface for mating with interior space of the heated base, and a pressure sealed cover configured with a pressure port. The method includes placing one or more prepreg fiber reinforced composite layers with an upper surface of the bond tool, and mating the lower surface of the bond tool with the interior space of the heated base. A pressure applying membrane is placed over the prepreg fiber reinforced composite layer(s), and the cover is sealed over the pressure applying membrane and prepreg fiber reinforced composite layers, and to the heated base. A space between the cover and the pressure applying membrane is pressurized via pressure applying apparatus connected to the pressure port. This pressure sealed region transfers pressure to the prepreg fiber reinforced composite layers via the pressure applying membrane; thereby forcing the prepreg fiber reinforced composite layers to conform with the upper shaped surface of the bond tool and to one another. Heat transfers from the heated base through the bond tool to the one or more prepreg fiber reinforced composite layers to heat the layers to a curing temperature of the prepreg fiber reinforced composite layers, thus curing the prepreg fiber reinforced composite layers under heat and pressure to form the fiber reinforced composite structure.

DETAILED DESCRIPTION

The present system and method provides an alternate approach for achieving the required pressure and heat necessary for adhering the layers and properly curing the resins of a composite structure, such as a fiber reinforced composite structure.

The system and method described herein cover an internally heated and pressurized system and a method for using the same to manufacture composite laminates, for example, fiber reinforced composite structures. In an embodiment, the present system and method utilizes an internally heated lower portion, and pressurized aspects at its upper portion, thereby eliminating the need for a conventional system, such as an autoclave and/or vacuum system. An upper shaped surface of a bond tool is formed to accept layers of laminates to produce a composite laminate of a specific shape. The lower surface of the bond tool is formed to mate with a heated base. The heated base simultaneously provides structural support for the bond tool and, when necessary, may apply uniform heat to the bond tool, for example, to cure the composite laminate. In addition, the system includes a pressure sealed region in its upper portion, for example between a pressure sealed cover or lid and a pressure applying membrane. Pressure is introduced into the pressure sealed region, for example, at an inlet port in the pressure sealed cover. The pressure seal cover mates with the heated base, thereby enclosing the bond tool, layers of laminate, and the pressure applying membrane. Pressure is introduced into the pressurized region, for example, via an air compressor coupled with the inlet port. The introduced pressure forces the pressure applying membrane against the layers of laminate, such that the layers of laminate conform to the shape of the bond tool's upper surface. The layers of laminate are heated and cured by applied heat via the heated base. In one embodiment, the layers of laminate are contained within a vented region, such that gases produced during heating the layers of laminate may escape, for example, via vents.

Figure 1:
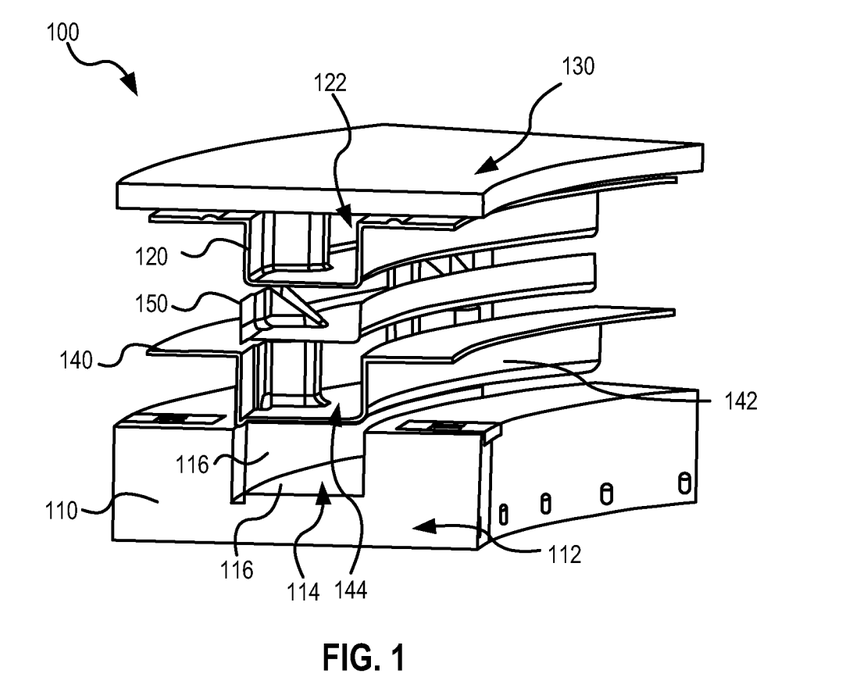
FIG. 1 is a perspective view of an internally heated and pressurized system for forming composite laminates, in an embodiment.
Figure 2A:
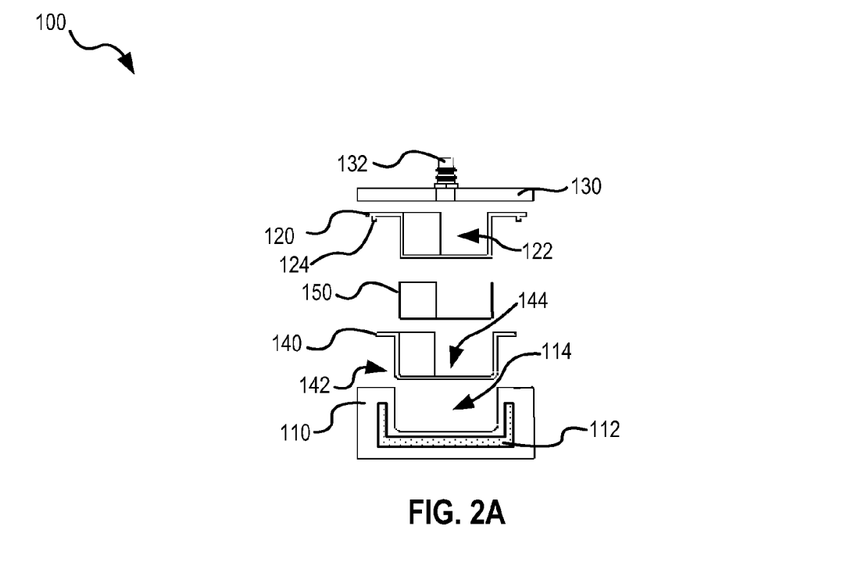
FIG. 2A is a side exploded view showing of the system of FIG. 1 in an internally heated and pressurized environment.

FIG. 1 shows an exploded, perspective view of a composite manufacturing system 100. Composite manufacturing system 100 is an internally heated and pressurized system. FIG. 2A shows composite manufacturing system 100 in an internally heated and pressurized embodiment. FIG. 1 and FIG. 2A are best viewed together with the following description. System 100 of FIGS. 1 and 2A includes four main components; a heated base 110, a pressure applying membrane 120, a pressure sealed cover 130, and a bond tool 140. Heated base 110 includes heat element 112 to provide heat to a laminate 150. In addition, heated base 110 is formed with an interior space 114 defined at least in part by one or more interior walls 116. Space 114 accepts and provides structural support for bond tool 140. The one or more interior walls 116 may be one curved interior wall 116, two interior walls 116 forming a triangular interior space 114, or any variation that creates an interior space 114 that accepts a bond tool of the required shape. Laminate 150 may, for example, be multiple layers of pre-impregnated (prepreg) fiber reinforced composite layers with resin. Other forms of heat-curable laminate may be used without departing from the scope of the invention described herein. In the present embodiment, pressure applying membrane 120 is formed with a pressure seal 124. Alternately, the pressure applying membrane and the pressure seal may be distinct components.

In one embodiment, bond tool 140 is fabricated from a light, thin, and heat conductive material. This facilitates fast heating when bond tool 140 is placed into heated base 110, and facilitates fast cooling when bond tool 140 is removed from heated base 110. Some examples of material usable to create bond tool 140 are steel, nickel, invar, epoxy laminate, and BMI laminate. Other materials may be used without departing form the scope herein.

Pressure applying membrane 120 facilitates the transfer of pressure from a sealed pressure region 122 (see below) to laminate 150 to form a fiber reinforced composite structure. Pressure applying membrane 120 may be, for example, a flexible formed sheet or a preformed flexible material (e.g., rubber, silicone, etc.) formed to have a shape that is complimentary to an upper surface 144 of bond tool 140. Hereafter, upper surface 144 is also referred to as upper shaped surface 144. As noted above, system 100 may include pressure seal 124 between pressure applying membrane 120 and pressure sealed cover 130, to facilitate in forming pressure sealed region 122. As shown in FIG. 2A, pressure sealed cover 130 includes an inlet port 132, which connects to a pressure providing apparatus (not shown), such that system 100 may be pressurized at pressure sealed region 122. Pressure may be provided by an air pressure generator such as an air compressor, although an alternate pressure generator may be used, such as a fluidic pressure generator. Additionally or alternately, a vacuum providing apparatus may generate a vacuum in a vacuum region (similar to vented space 148, FIG. 5) between the heated base or the bond tool and the pressure applying membrane such that a laminate between the bond tool and the pressure applying membrane is forced to conform to a portion of the upper surface of the bond tool.

Figure 2B:
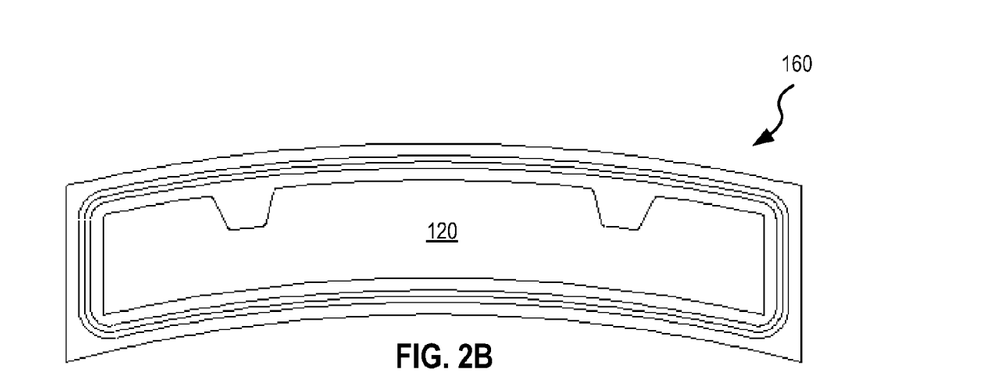
FIG. 2B is a birds-eye view of an exemplary pressure applying membrane for use with the system of FIGS. 1-2.

FIG. 2B shows a bird's eye view 160 of an exemplary pressure applying membrane 120.

The above description is exemplary and should not be considered limiting in any way. For example, it will be appreciated that heated base 110 may accept one of a plurality of bond tools 140. For example, a lower surface 142 of each bond tool 140 mates with heated base 110 at interior space 114 to provide thermal communication between the interior walls 116 of heated base 110 and bond tool 140. Each bond tool 140's upper surface 144 is shaped for forming one of a plurality of fiber reinforced composite structures. In addition, heated base 110 may include one or more heating elements 112. Examples of heating elements include, but are not limited to, electrically heating thermal elements, channels for the transmission of a heated fluid, and inductive heating elements. The type, shape, spacing, and number of heating elements relate to the specific configuration of system 100. In a separate embodiment, cooling elements may be included in the bond tool to reduce the time between removing the bond tool from the heated base and de-molding the laminate. Alternately or additionally, the heated base includes cooling elements (not shown).

Figure 3:
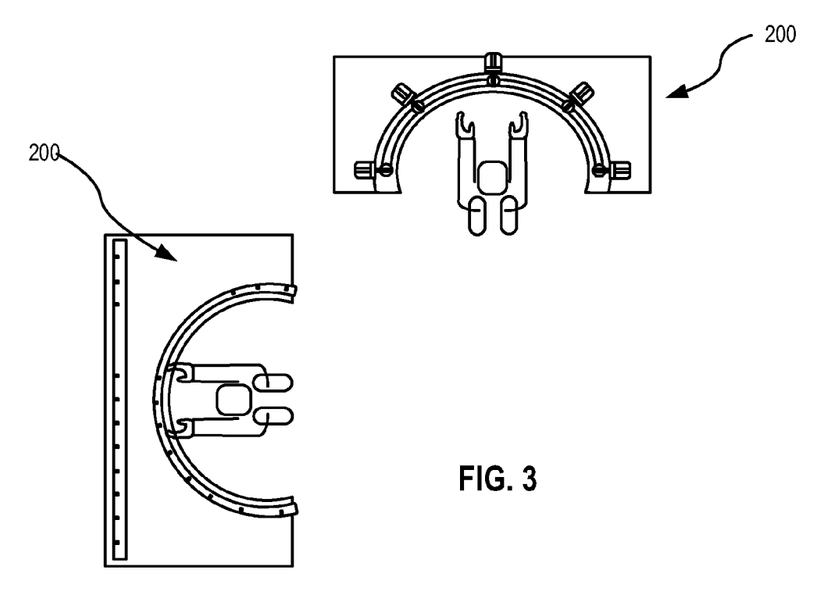
FIG. 3 is a birds-eye view of a person working at an internally heated and pressurized system for forming composite laminates to form a fiber reinforced composite structure, in an embodiment.
Figure 4:
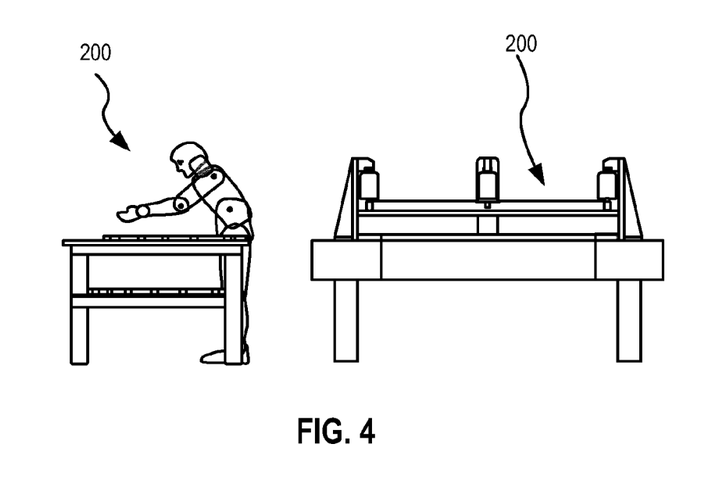
FIG. 4 is a side view of the person working at system of FIG. 3.
Figure 5:
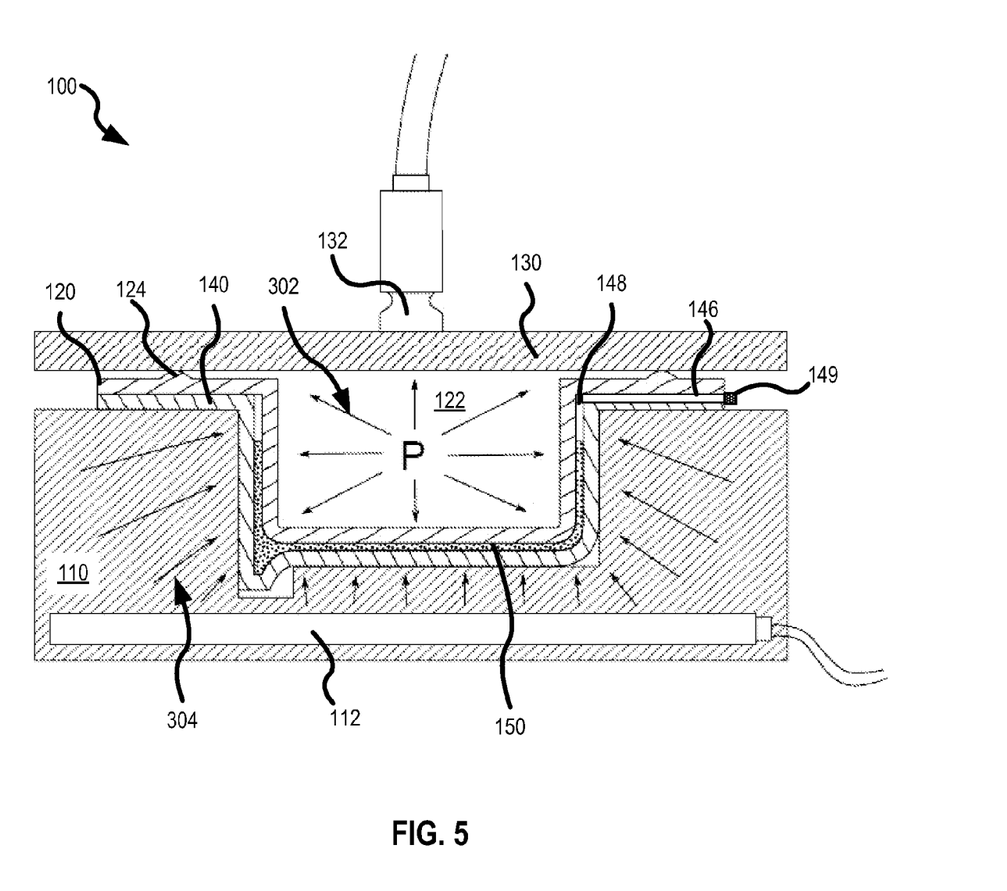
FIG. 5 schematically illustrates application of heat and pressure to the internally heated and pressurized system of FIG. 1 to form a fiber reinforced composite structure, according to an embodiment.

FIG. 3 and FIG. 4 show a person working at a composite manufacturing system formed as a composite manufacturing table 200 for forming a part of a specific curvature. FIG. 5 illustrates application of heat and pressure to the system of FIGS. 1 and 2 to form laminate 150 into a part (e.g., an aircraft part). Seal 124 co-operates with pressure sealed cover 130 and pressure applying membrane 120 to maintain pressure 302 within pressure sealed region 122. Pressure 302 is applied to pressure sealed region 122 via inlet port 132. Pressure 302 on pressure applying membrane 120 forces laminate 150 to conform to upper surface 144 (FIGS. 1 and 2) of bond tool 140. Heat 304, generated by heating element 112 within heated base 110, heats bond tool 140, which in turn heats and cures laminate 150. Heated base 110 also provides structural support for bond tool 140. Optional vent 146 is shown incorporated into bond tool 140. Optional vent 146 may be utilized for releasing gases from a vented space 148, for example, when pressure is applied to laminate 150 and/or during curing of laminate 150. It will be appreciated that more than one vent may be included. Alternatively, optional vent 146 may be modified with a vacuum port 149 to cooperate with a vacuum pump (not shown) to pull gases from vented space 148. Pulling gases out of vented space 148 may increase the effective pressure 302 by removing pressure causing gases that may oppose pressure 302 and may decrease curing time.

Alternately or additionally, seal 124 is replaced by or augmented with a seal that co-operates with pressure sealed cover 130 and heated base 110 to maintain pressure 302 within pressure sealed region 122. The alternate or additional seal may incorporated with cover 130 or base 110, or it may be a separate component that is placed between cover 130 and base 110.

Figure 6:
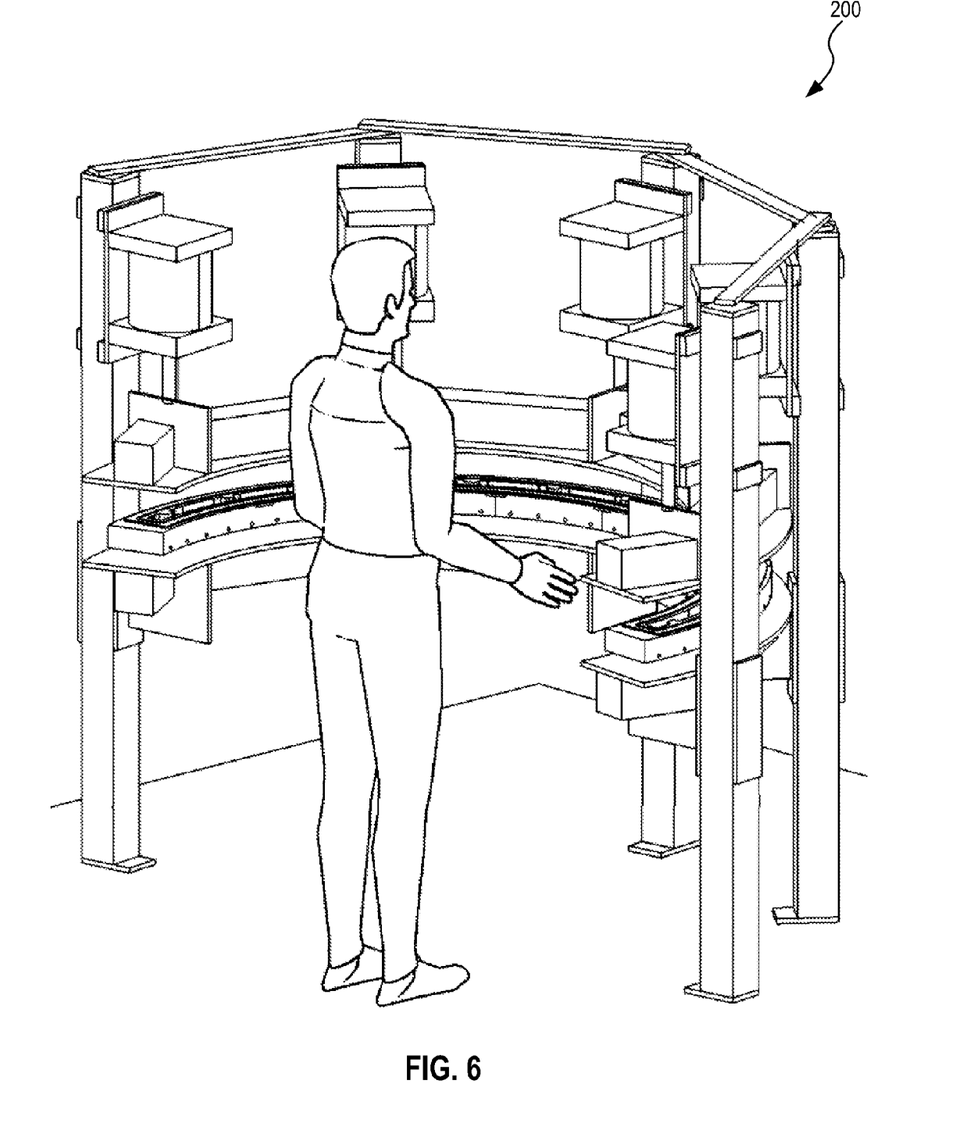
FIG. 6 is a perspective view of a person working at the system of FIG. 3, in an embodiment.

FIG. 6 shows composite manufacturing table 200 of FIGS. 3 and 4, in an embodiment. Exemplary composite manufacturing table 200 utilizes the components described above with respect to FIGS. 1, 2 and 5, but extends in a "180 degree arc" table, which may be used to fabricate a plurality of parts at one time, or to fabricate one or more larger parts. It will be appreciated that other table shapes and orientations may be used, depending on the desired shape of part(s) to be formed, without departing from the scope herein.

Figure 7:
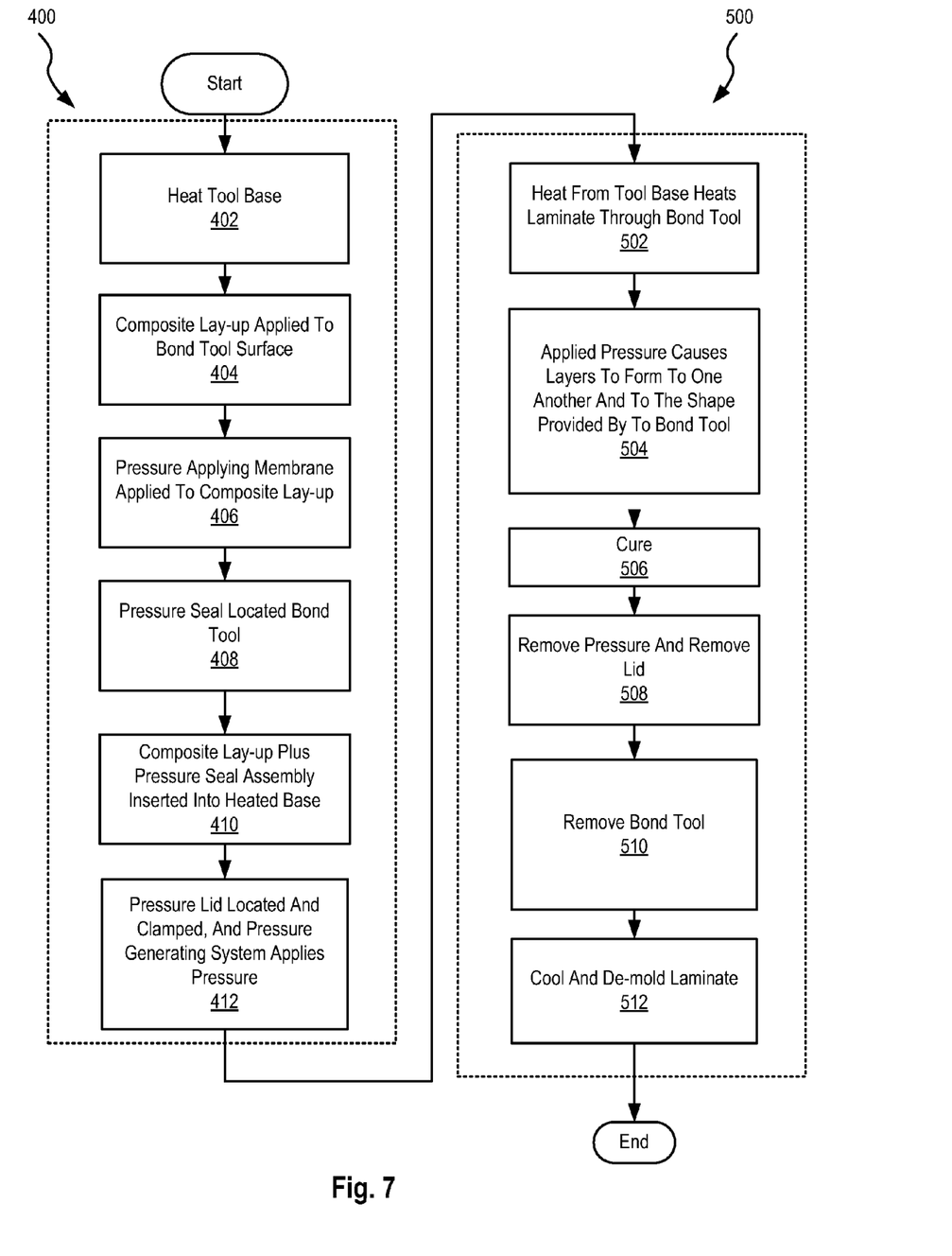
FIG. 7 is a flowchart illustrating one exemplary method for using an internally heated and pressurized system for forming composite laminates to form a fiber reinforced composite structure.

FIG. 7 illustrates a method 400 for preparing system 100 for use. FIG. 7 also shows a method 500 for forming, heating and curing composite laminate (e.g., laminate 150). FIG. 7 is best viewed in combination with FIG. 5 and the following description. In one aspect, in step 402, a heated base is heated to temperature. One example of step 402 is heating heated base 110 (FIG. 5) via heating elements 112 to generate heat 304. One example of generating heat is electrically generating heat.

In step 404 a composite lay-up is applied to the bond tool upper surface. One example of step 404 is applying a plurality of laminate components of laminate 150 to upper surface 144 of bond tool 140.

In step 406, a pressure applying membrane is applied to the composite lay-up. For example, pressure applying membrane is placed over laminate 150.

In step 408, a pressure seal is located over the bond tool, which holds the composite lay-up. In one example, steps 406 and 408 are accomplished simultaneously by placing a pressure applying membrane with incorporated pressure seal 124 over laminate 150 in bond tool 140. In another example, a separate pressure seal is placed between membrane 120 and cover 130, or between cover 130 and base 110, proximate pressure applying membrane 120.

In step 410, the bond tool, composite lay-up, and pressure seal are placed into the heated base. One example of step 408 is placing bond tool 140, which holds laminate 150 and pressure applying membrane 120, into heated base 110.

In step 412, a pressure sealed cover is placed with and secured to the heated base, and a pressure generating system applies pressure to system 100. One example of step 412 is clamping pressure sealed cover 130 onto heated base 110. Clamping pressure sealed cover 130 onto heated base creates pressure sealed region 122 between cover 130 and pressure applying membrane 120 (e.g., via pressure seal 124) or between cover 130 and base 110 (e.g., via an alternate seal placed between cover 130 and base 110). Pressure 302 is then introduced into pressure applying region 302 via inlet port 132.

Method 500 (FIG. 7) illustrates forming, heating and curing a composite laminate. In step 502, a heated base transfers heat through the bond tool into the laminate. In one example of step 502, heat 304 is transferred from heated base 110 to laminate 150 via bond tool 140.

In step 504, applied pressure causes composite layers to form to one another and to conform to the shape provided by the upper surface of the bond tool. In one example of step 504, pressure 302 presses membrane 120 into laminate 150, which in turn forces laminate 150 to conform to upper surface 144 of bond tool 140.

In step 506, the laminate is cured. In one example of step 506, laminate 150 is cured for a predetermined cure time.

In step 508, after an appropriate cure time, pressure is vented and the pressure sealed cover is removed. In one example of step 508, pressure 302 is released from pressure sealed region 122 and pressure sealed cover 130 is removed.

In steps 510, the bond tool is extracted from the heated base for cooling. In step 512 the laminate is cooled and de-molded. In one example of step 510, bond tool 140, which holds laminate 150 and pressure applying membrane 120, is removed from heated base 110. In one example of step 512, laminate 150 is cooled and de-molded from bond tool 140. Method 500 ends after step 512.

Advantages to using internally heated and pressurized system 100 in order to fabricate composite structures are at least as follows:
  The heated base, for example heated base 110, provides both heat for the system and structural strength for the bond tool, for example, bond tool 140.
  Pressure applying membrane 120, eliminates normal bagging materials and provides a seal for the pressure sealed cover (e.g., pressure seal 124).
  Normal shop air pressure can be used to apply pressure to the system.
  This internally heated and pressurized system reduces power requirements and eliminates any need for additional ovens and autoclaves. Also, a generic heated base which is formed to couple with the lower surface of a plurality of bond tools allows for the construction of a plurality of different parts using the same heated base. Thus, bond tools and pressure seals that have different structural details may be fitted into the generic heated base thereby vastly increasing the flexibility, utility and efficiency of the present system and method over the prior art.

The internally heated and pressurized system and related method disclosed herein may be used in a fast cure process as disclosed in U.S. patent application Ser. No. 13/763,416 by Boone et al., filed 8 Feb. 2013 and entitled "Fast Cure Process". The internally heated and pressurized system and method disclosed herein may also be used in forming a skeleton structure assembly, as disclosed in U.S. patent application Ser. No. 13/763,427 by Boone et al., filed 8 Feb. 2013 and entitled "Assembly Using Skeleton Structure", or with a composite layup as disclosed in U.S. patent application Ser. No. 13/763,543 by Boone et al., filed 8 Feb. 2013 and entitled "Composite Layup and Method of Forming." Each of these applications is incorporated herein by reference.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

The invention claimed is:

1. A method for preparing an internally heated and pressurized system in preparation for fabricating a fiber reinforced composite structure from one or more pre-impregnated (prepreg) fiber reinforced composite layers, comprising:
    heating a base using one or more heating elements integrated with the base;
    layering one or more prepreg fiber reinforced composite layers within an upper, shaped surface of a bond tool,
    mating a lower surface of the bond tool, with an interior space of the heated base, the interior space defined by one or more interior walls of the heated base and shaped to accommodate the lower surface of the bond tool;
    positioning a pressure applying membrane over the bond tool and the one or more prepreg fiber reinforced composite layers;
    positioning a pressure seal to facilitate sealing the prepreg fiber reinforced composite layers within a pressure sealed region,
    positioning a pressure sealed cover over the pressure applying membrane and in contact with the pressure seal;
    securing the pressure sealed cover to the heated base, such that the pressure sealed region is formed beneath the cover; and
    coupling a pressure providing apparatus to a pressure port of the pressure sealed cover, to provide pressure to the pressure sealed region;
    wherein, when in use, pressure is maintained within the pressure sealed region to facilitate curing the one or more prepreg fiber reinforced composite layers.

2. The method of claim 1, wherein layering one or more prepreg fiber reinforced composite layers with upper shaped surface of said bond tool comprises placing multiple layers of prepreg fiber reinforced composite material with the upper shaped surface of said bond tool, such that fibers of the material are oriented at plus or minus 45 degrees, one layer relative to another.

3. The method of claim 1, wherein layering one or more prepreg fiber reinforced composite layers with the upper shaped surface of said bond tool comprises layering a first and a second prepreg fiber reinforced composite layer with the upper shaped surface of said bond tool.

4. The method of claim 1, wherein positioning the pressure seal comprises positioning the pressure seal such that the seal is located between the pressure sealed cover and the bond tool, when the cover is placed with the base.

5. The method of claim 1, wherein positioning the pressure seal comprises positioning the pressure seal such that the seal is located between the pressure sealed cover and the heated base, when the cover is placed with the base.

6. The method of claim 1, wherein the pressure seal is formed with an upper surface of the pressure applying membrane, such that the pressure sealed region is formed between the pressure applying membrane and the cover, when the cover is secured to the base and pressure is applied.

7. The method of claim 1, further comprising coupling a vacuum port in pneumatic communication with a vented space between the bond tool and the pressure applying membrane in preparation for the evacuation of the vented space for increasing the pressure generated in the pressure seal region, wherein the vacuum port is connected to a vacuum providing apparatus.

8. The method of claim 1, further comprising preparing vents for venting gases from a venting region between the bond tool the pressure applying membrane during the curing of the prepreg fiber reinforced composite layers.

9. An internally heated and pressurized system for fabricating a fiber reinforced composite structure comprising:
    a heated base including one or more heating elements and an interior space defined by one or more interior walls of the heated base;
    a bond tool having a lower surface and an upper surface, the lower surface configured to mate with the interior space of the heated base such that the heated base supports the bond tool, the upper surface configured to accept one or more pre-impregnated fiber reinforced composite layers for forming the fiber reinforced composite structure; and
    a pressure sealed cover for securing with the heated base to cover the heated base, the bond tool, and the one or more fiber reinforced composite layers; the pressure sealed cover forming a pressure port for coupling with a pressure providing apparatus.

10. The system of claim 9, further comprising:
    a pressure applying membrane for pressurizing the one or more fiber reinforced composite layers; and
    a pressure seal;
    wherein the pressure seal co-operates with the pressure sealed cover to maintain a pressure sealed region between the pressure sealed cover and the pressure applying membrane.

11. The system of claim 9, wherein the bond tool includes vents for venting gases produced during curing one or more prepreg fiber reinforced composite layers.

12. The system of claim 9, wherein the bond tool further comprises a vacuum port for coupling to a vacuum generating apparatus for generating a vacuum within a vented space between the pressure applying membrane and the bond tool.

13. The system of claim 9, further comprising a plurality of bond tools, each having (a) a lower surface shaped and sized to mate with the interior space of the heated base and (b) an upper surface for forming different fiber reinforced composite structures.

14. The system of claim 9, wherein the bond tool is fabricated from a light, thin, and thermally conductive material.

15. The system of claim 14, wherein the light, thin, and thermally conductive material is selected from the group consisting of steel, nickel, invar, epoxy laminate, and BMI laminate.

16. The system of claim 14, wherein the heated base provides structural support for the bond tool.

17. The system of claim 9, wherein the bond tool thermally couples with the heated base.

18. A method for forming a fiber reinforced composite structure from one or more pre-impregnated (prepreg) fiber reinforced composite layers using an internally heated and pressurized system, the internally heated and pressurized system including a heated base having heating elements and an interior space formed of one or more interior walls, a bond tool having an upper shaped surface and a lower surface for mating with interior space of the heated base, and a pressure sealed cover configured with a pressure port, the method comprising steps of:

placing one or more prepreg fiber reinforced composite layers with an upper surface of the bond tool;

mating the lower surface of the bond tool with the interior space of the heated base;

applying a pressure applying membrane over the prepreg fiber reinforced composite layer(s);

sealing the cover over the pressure applying membrane and prepreg fiber reinforced composite layers, and to the heated base;

pressurizing a region between the cover and the base via the pressure port, to form a pressure sealed region in which the pressure applying membrane transfers pressure to the prepreg fiber reinforced composite layers, forcing the prepreg fiber reinforced composite layers to conform with the upper shaped surface of the bond tool and to one another;

transferring heat from the heated base through the bond tool to the one or more prepreg fiber reinforced composite layers to heat the layers to a curing temperature of the prepreg fiber reinforced composite layers; and     curing the prepreg fiber reinforced composite layers under heat and pressure to form the fiber reinforced composite structure.

19. The method of claim 18, wherein sealing the cover over the pressure applying membrane comprises placing the cover over a pressure seal formed with the pressure applying membrane.

20. The method of claim 18, further comprising removing the pressure;

removing the pressure sealed cover;

removing the bond tool;

cooling the fiber reinforced composite structure; and de-molding the fiber reinforced composite structure from the bond tool.

21. The method of claim 18, further comprising venting gases generated by heating the prepreg fiber reinforced composite layers.

22. The method of claim 18, further comprising generating a vacuum in a vacuum region between the pressure applying membrane and the bond tool, to facilitate molding the prepreg fiber reinforced composite layers with the shaped upper surface of the bond tool.

\* \* \* \* \*